Nov. 5, 1957   L. G. BOEHNER   2,812,030
MOTOR VEHICLE FUEL TANK
Filed Nov. 17, 1954
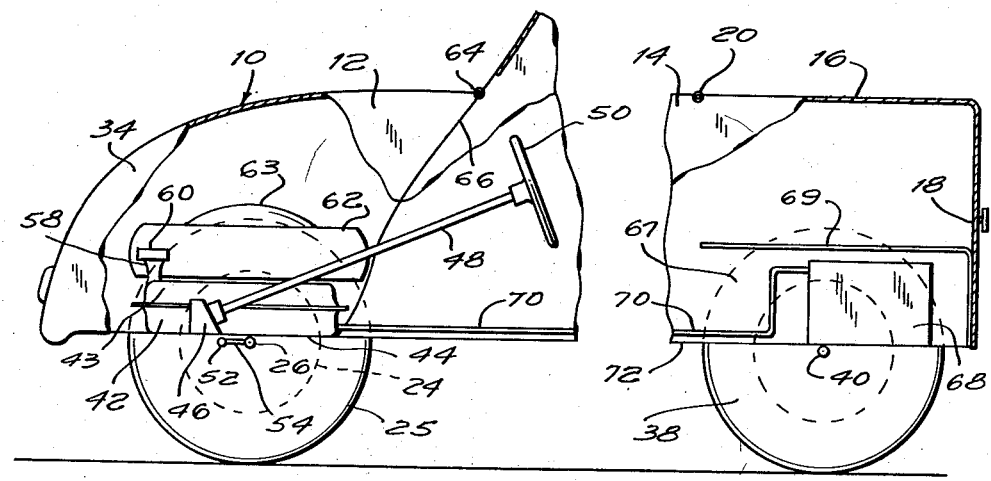
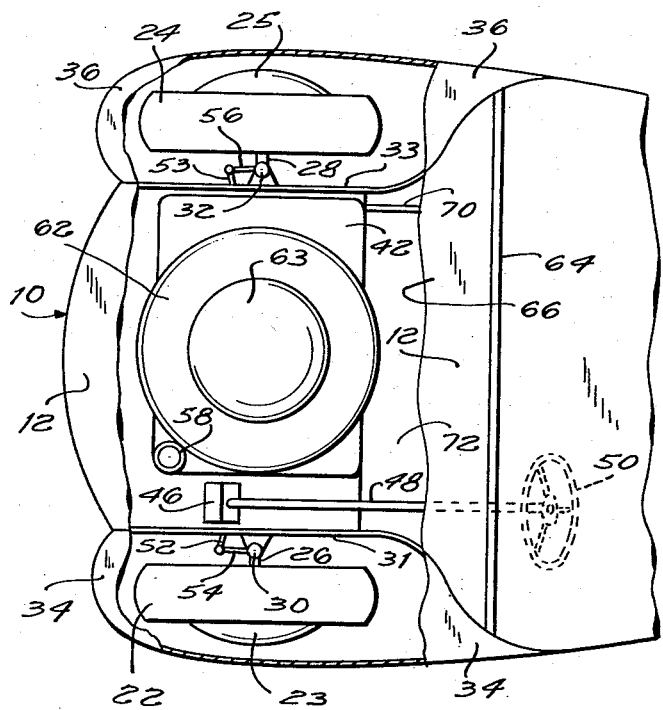
INVENTOR.
LUDWIG G. BOEHNER
BY
AGENT United States Patent Office 2,812,030
Patented Nov. 5, 1957

2,812,030

MOTOR VEHICLE FUEL TANK

Ludwig G. Boehner, Braunschweig, Germany

Application November 17, 1954, Serial No. 469,508

2 Claims. (Cl. 180—1)

The present invention relates to self-propelled vehicles, and more particularly to self-propelled vehicles having a fuel container.

It is an object of the present invention to improve the arrangement of the parts of the self-propelled vehicle so as to provide more space for accommodating luggage and similar objects.

It is another object of the present invention to improve the outward shape of the self-propelled vehicle.

In one embodiment of the present invention the fuel tank is arranged in the front part of the body of the self-propelled vehicle substantially at the level of the axles of the front wheels, the steering mechanism being arranged substantially at the level of the fuel tank and between the same and one of the wheels.

In a preferred embodiment of the present invention a spare wheel is arranged on and above the fuel tank so as to act as a shock damper protecting the fuel tank from impacts directed against the upper face and the front face thereof. By arranging the fuel tank in a less elevated position additional luggage space is gained in the front part of the body of the vehicle whereas the engine is arranged in the lower part of the rear portion of the body thereby improving considerably the exploitation and/or the filling of the space in the upper part of the rear part of the body of the self-propelled vehicle.

Other objects and advantages of the present invention will become apparent from the following detailed description thereof when read in connection with the accompanying drawings forming part of this specification and showing, by way of example, a preferred embodiment of the present invention. In the drawings Fig. 1 is a diagrammatic side elevation, with certain parts broken away, of a self-propelled vehicle according to the present invention, and Fig. 2 is a plan view, with certain parts broken away, of the front portion of the vehicle shown in Fig. 1.

Referring now to the drawings, the body or frame generally denoted by 10 of the self-propelled vehicle comprises a front portion 12 and a rear portion 14 having a hood 16 with a handle 18. The hood 16 is pivotally connected to the rear portion 14 of the body or frame by means of a hinge 20.

The self-propelled vehicle comprises a pair of front wheels 22 and 24 provided, respectively, with hubs 23 and 25 and rigidly connected, respectively, with the centers thereof with axles 26 and 28 which are pivotally connected at pivotal points 30 and 32 with the side walls 31, 33 separating the front portion 12 from the hoods 34 and 36 forming part of the body 10 and housing the front wheels 22 and 24.

A pair of rear wheels such as 38 is connected by axles such as 40 with the bottom 72 of the body 10.

A fuel tank 42 is arranged on the bottom 70 of the body 10 and has substantially the shape of a flat right-angled parallelepipedon having a substantially horizontal lower face 44 arranged substantially at the level of the axles 26 and 28 and between the same.

A steering mechanism 46 is arranged substantially at the level of the fuel tank 42 between one of the shorter sides thereof and the front wheel 22. A steering rod 48 connects the steering mechanism 46 with a steering wheel 50.

Tie rod means 52, 53 are arranged below the fuel tank 42 and are connected, respectively, with the links 54, 56 rigidly connected with the axles 26, 28 of the front wheels 22, 24. The tie rod means 52, 53 are connected with the steering mechanism 46 by a linkage (not shown), for instance by a gear wheel transmission so as to transfer the rotation of the steering rod 48 about the axis thereof to the tie rod means 52, 53 and from there over the connecting links 54, 56 to the axles 26, 28 of the front wheels 22, 24.

The fuel tank 42 is provided with a short feed pipe 58 closed by a removable stopper 60 or the like.

A spare wheel 62 having a hub 63 is arranged on and above the upper face 43 of the fuel tank 42 and below the front portion 12 of the body 10. The front portion 12 is hingedly connected at 64 with the part 66 (window frame) and the space underneath the front portion 12 may be used, if desired, for accommodating additional objects (not shown) such as repair kits or additional luggage. The spare wheel 62 leaves the feed pipe 58 and the stopper 60 thereof free so as to render the latter freely accessible even when the spare wheel 62 is in position on the fuel tank 42.

The rear portion 14 of the body 10 accommodates in the lower part 67 thereof the engine block 68 connected with the fuel tank 42 by a pipe 70 arranged substantially directly above the bottom 72 of the body 10. The upper part of the rear portion 14 is separated from the lower part 67 thereof by a substantially horizontal partition 69 and covered by the hinged hood 16 so as to be available for the accommodation of luggage and/or other objects.

In operation the fuel tank 42 is arranged in the front part 12 of the body 10 together with the steering mechanism 46 of the pair of front wheels 22, 24, thus leaving the rear part 14 of the body 10 free for accommodating the negine block 68 in the lower part 67 thereof whereas the space above the partition 69 is available for luggage and the like.

Furthermore the spare wheel 62 is carried by the fuel tank 42 and protects the same against shocks from above and the front.

I have described my invention in connection with a self-propelled vehicle. It should, however, be understood that the described embodiment of my invention is only an example thereof and that many changes, substitutions of elements, and equivalents thereof are to be considered as falling within the scope of my invention which is defined by the appended claims.

What I claim and desire to secure by Letters Patent is:

1. In a self-propelled vehicle having an engine in the rear portion of the vehicle body, the combination comprising, a pair of stub axles sucpended from the front portion of said body adjacent the sides thereof, a pair of front wheels connected, respectively, with said stub axles so as to be steerable, a fuel tank arranged in said front portion of said body, said fuel tank being suspended therefrom approximately at the height of said front axles and between the same, and a steering mechanism arranged in said front portion substantially at the level of said fuel tank and adjacent to the same, said fuel tank having substantially the shape of a flat right-angled parallelepipedon and being adapted to carry a spare wheel arranged in a substantially horizontal position on said fuel tank.

2. A vehicle as claimed in claim 1, said flat right-angled parallelepipedon having a horizontal lower face arranged substantially at the level of said front axles and between the same.

References Cited in the file of this patent

UNITED STATES PATENTS

| | | |
|---|---|---|
| 2,393,623 | Ehrenberg | Jan. 29, 1946 |
| 2,631,886 | Keller | Mar. 17, 1953 |

FOREIGN PATENTS

| | | |
|---|---|---|
| 872,978 | France | Mar. 2, 1942 |
| 652,422 | Great Britain | Apr. 25, 1951 |
| 662,398 | Great Britain | Dec. 5, 1951 |